(12) United States Patent
Son

(10) Patent No.: US 9,645,355 B2
(45) Date of Patent: May 9, 2017

(54) LENS MODULE

(71) Applicant: Samsung Electro-Mechanics Co., Ltd., Suwon-si (KR)

(72) Inventor: Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/937,219

(22) Filed: Nov. 10, 2015

(65) Prior Publication Data

US 2016/0154207 A1    Jun. 2, 2016

(30) Foreign Application Priority Data

Nov. 28, 2014    (KR) ......................... 10-2014-0168382

(51) Int. Cl.
  *G02B 3/02*    (2006.01)
  *G02B 13/00*   (2006.01)
  *G02B 13/22*   (2006.01)

(52) U.S. Cl.
  CPC ........... *G02B 13/004* (2013.01); *G02B 13/22* (2013.01)

(58) Field of Classification Search
  CPC .................................................. G02B 13/004
  USPC ........................................................ 359/715
  See application file for complete search history.

(56) References Cited

U.S. PATENT DOCUMENTS

| | | | |
|---|---|---|---|
| 7,889,441 B2 | 2/2011 | Yasuhiko et al. | |
| 8,068,290 B1 | 11/2011 | Tsai et al. | |
| 2013/0335836 A1 | 12/2013 | Chung et al. | |
| 2014/0184895 A1 | 7/2014 | Ahn et al. | |
| 2014/0198397 A1* | 7/2014 | Sekine | G02B 13/004 359/715 |
| 2015/0219877 A1 | 8/2015 | Zhao et al. | |

FOREIGN PATENT DOCUMENTS

| | | |
|---|---|---|
| CN | 101135768 A | 3/2008 |
| CN | 102478703 A | 5/2012 |
| KR | 10-2014-0089007 A | 7/2014 |
| KR | 10-2015-0092610 A | 8/2015 |

OTHER PUBLICATIONS

Korean Office Action issued on Jul. 25, 2016 in counterpart Korean Application No. 10-2014-0168382 (13 pages in English; 9 pages in Korean).

* cited by examiner

*Primary Examiner* — James Jones
(74) *Attorney, Agent, or Firm* — NSIP Law

(57) ABSTRACT

A lens module includes a first lens having a convex object-side surface and a convex image-side surface, a second lens having a concave object-side surface; a third lens having a meniscus shape; and a fourth lens having an inflection point formed on an image-side surface and a convex object-side surface. A distance from an image-side surface of the third lens to the object-side surface of the fourth lens may be less than 0.05. In an embodiment, r2, a radius of curvature of an image-side surface of the first lens, and, f, an overall focal length of an optical system including the first through fourth lenses may satisfy $-0.94 < r2/f < -0.79$. In an alternative embodiment, FOV, a field of view of an optical system including the first through fourth lenses is greater than 80.

20 Claims, 15 Drawing Sheets

| SURFACE NO. | RADIUS OF CURVATURE | THICKNESS/ DISTANCE | REFRACTIVE INDEX | ABBE NUMBER | EFFECTIVE RADIUS | REMARKS |
|---|---|---|---|---|---|---|
| OBJECT | Infinity | Infinity | | | | |
| ST | Infinity | -0.0300 | | | 0.45000 | STOP |
| 1 | 1.5166 | 0.5066 | 1.5465 | 56.11 | 0.45956 | FIRST LENS |
| 2 | -1.8572 | 0.0400 | | | 0.52000 | |
| 3 | -57.9583 | 0.2206 | 1.6455 | 23.52 | 0.56803 | SECOND LENS |
| 4 | 1.7860 | 0.2729 | | | 0.61018 | |
| 5 | -2.7821 | 0.5928 | 1.5465 | 56.11 | 0.69661 | THIRD LENS |
| 6 | -0.5942 | 0.0403 | | | 0.91107 | |
| 7 | 5.9006 | 0.3983 | 1.5365 | 55.65 | 1.23332 | FOURTH LENS |
| 8 | 0.5658 | 0.2583 | | | 1.54156 | |
| 11 | Infinity | 0.2100 | IR Glass or Filter(Plastic) | | 1.63926 | FILTER |
| 12 | Infinity | 0.4216 | | | 1.70443 | |
| IMAGE PLANE | Infinity | -0.0009 | | | 1.93359 | |

FIG. 4

| FIRST EMBODIMENT | 1 | 2 | 3 | 4 | 5 | 6 | 7 | 8 |
|---|---|---|---|---|---|---|---|---|
| CONIC (K) | -1.5225 | 1.2824 | -9.9998 | 3.9660 | -0.0393 | -0.7619 | -9.7921 | -5.1656 |
| 4TH ORDER (A) | -0.1665 | -0.2495 | -0.2194 | -0.1003 | 0.2497 | 1.2821 | -0.7607 | -0.4171 |
| 6TH ORDER (B) | 0.5470 | 0.2510 | 0.7086 | 0.3699 | -2.1900 | -5.2434 | 0.6399 | 0.5252 |
| 8TH ORDER (C) | -9.4088 | -0.0385 | 0.7227 | -5.5104 | 9.9044 | 19.1629 | -0.2900 | -0.5043 |
| 10TH ORDER (D) | 43.4607 | 0.2494 | 0.2801 | 43.3348 | -36.0481 | -48.6610 | 0.8023 | 0.3323 |
| 12TH ORDER (E) | -92.0600 | 0.2510 | -0.7500 | -163.5426 | 95.3750 | 77.5973 | -1.1061 | -0.1433 |
| 14TH ORDER (F) | 22.8078 | 0.2510 | 0.0064 | 306.6864 | -139.3441 | -63.9646 | 0.6007 | 0.0362 |
| 16TH ORDER (G) | 99.9998 | 0.2510 | -0.7500 | -221.8682 | 81.1361 | 20.4200 | -0.1170 | -0.0040 |

FIG. 5

| SURFACE NO. | RADIUS OF CURVATURE | THICKNESS/ DISTANCE | REFRACTIVE INDEX | ABBE NUMBER | EFFECTIVE RADIUS | REMARKS |
|---|---|---|---|---|---|---|
| OBJECT | Infinity | Infinity | | | | |
| ST | Infinity | -0.0300 | | | 0.45000 | STOP |
| 1 | 1.4737 | 0.5482 | 1.5465 | 56.11 | 0.46172 | FIRST LENS |
| 2 | -2.0354 | 0.0400 | | | 0.52000 | |
| 3 | -14.6961 | 0.2200 | 1.6455 | 23.52 | 0.56610 | SECOND LENS |
| 4 | 2.0677 | 0.2608 | | | 0.61305 | |
| 5 | -2.9003 | 0.5875 | 1.5465 | 56.11 | 0.66997 | THIRD LENS |
| 6 | -0.5610 | 0.0400 | | | 0.88654 | |
| 7 | 9.4234 | 0.3822 | 1.5365 | 55.65 | 1.20163 | FOURTH LENS |
| 8 | 0.5462 | 0.2612 | | | 1.51723 | |
| 11 | Infinity | 0.2100 | IR Glass or Filter(Plastic) | | 1.62572 | FILTER |
| 12 | Infinity | 0.4220 | | | 1.69090 | |
| IMAGE PLANE | Infinity | -0.0020 | | | 1.93283 | |

FIG. 9

| SECOND EMBODIMENT | 1 | 2 | 3 | 4 | 5 | 6 | 7 | 8 |
|---|---|---|---|---|---|---|---|---|
| CONIC (K) | -1.0000 | -0.9470 | 10.0000 | 7.5490 | 4.8405 | -0.7994 | 10.0000 | -5.3661 |
| 4TH ORDER (A) | -0.1000 | -0.1375 | -0.0648 | -0.0624 | 0.0446 | 1.6218 | -0.5311 | -0.3767 |
| 6TH ORDER (B) | -0.2100 | 0.1636 | 0.5000 | -0.0436 | 1.4300 | -6.1809 | 0.1297 | 0.4533 |
| 8TH ORDER (C) | -0.2100 | 0.0582 | 0.5000 | -0.0361 | -18.7421 | 20.4970 | 0.4166 | -0.4525 |
| 10TH ORDER (D) | -0.2100 | 0.2500 | 0.4525 | -0.1500 | 105.0671 | -47.2673 | -0.0429 | 0.3204 |
| 12TH ORDER (E) | -0.2100 | 0.2500 | -0.1671 | 0.1001 | -320.3714 | 70.3680 | -0.3967 | -0.1488 |
| 14TH ORDER (F) | -0.2100 | 0.2500 | -0.2500 | 0.1001 | 518.9496 | -56.3639 | 0.2762 | 0.0397 |
| 16TH ORDER (G) | -0.2100 | 0.2500 | -0.2500 | 0.1002 | -353.7946 | 17.9903 | -0.0573 | -0.0045 |

FIG. 10

| SURFACE NO. | RADIUS OF CURVATURE | THICKNESS/ DISTANCE | REFRACTIVE INDEX | ABBE NUMBER | EFFECTIVE RADIUS | REMARKS |
|---|---|---|---|---|---|---|
| OBJECT | Infinity | Infinity | | | | |
| ST | Infinity | -0.0300 | | | 0.45000 | STOP |
| 1 | 1.5146 | 0.5038 | 1.5465 | 56.11 | 0.46121 | FIRST LENS |
| 2 | -1.7300 | 0.0400 | | | 0.52000 | |
| 3 | -26.0738 | 0.2397 | 1.6455 | 23.52 | 0.56308 | SECOND LENS |
| 4 | 1.8125 | 0.2853 | | | 0.60356 | |
| 5 | -2.3738 | 0.5599 | 1.5465 | 56.11 | 0.65749 | THIRD LENS |
| 6 | -0.6146 | 0.0400 | | | 0.88000 | |
| 7 | 2.7815 | 0.3700 | 1.5365 | 55.65 | 1.18103 | FOURTH LENS |
| 8 | 0.5274 | 0.2551 | | | 1.45326 | |
| 11 | Infinity | 0.2100 | IR Glass or Filter(Plastic) | | 1.54033 | FILTER |
| 12 | Infinity | 0.4239 | | | 1.60437 | |
| IMAGE PLANE | Infinity | -0.0039 | | | 1.82424 | |

FIG. 14

| THIRD EMBODIMENT | 1 | 2 | 3 | 4 | 5 | 6 | 7 | 8 |
|---|---|---|---|---|---|---|---|---|
| CONIC (K) | -1.8508 | 2.0000 | 10.0000 | 4.7693 | 1.3448 | -0.7392 | 0.4005 | -4.7624 |
| 4TH ORDER (A) | -0.1778 | -0.2510 | -0.1993 | -0.0387 | 0.3496 | 1.1948 | -1.0889 | -0.5207 |
| 8TH ORDER (B) | 0.6363 | 0.2510 | 0.6786 | -0.7336 | -2.5411 | -5.2406 | 0.9284 | 0.7001 |
| 8TH ORDER (C) | -11.0639 | -0.1162 | 0.7500 | 5.5190 | 5.8403 | 19.5794 | 0.4619 | -0.6727 |
| 10TH ORDER (D) | 49.5554 | -0.2319 | 0.1330 | -23.5527 | 5.2670 | -50.4054 | -1.2125 | 0.4338 |
| 12TH ORDER (E) | -99.9930 | 0.2510 | -0.7500 | 65.3727 | -68.6537 | 83.5719 | 0.8030 | -0.1807 |
| 14TH ORDER (F) | 15.7592 | 0.2510 | -0.7501 | -106.8860 | 173.1624 | -73.3816 | -0.2374 | 0.0439 |
| 16TH ORDER (G) | 99.9875 | 0.2510 | -0.7501 | 79.6162 | -159.4566 | 25.3792 | 0.0265 | -0.0047 |

FIG. 15

LENS MODULE

CROSS-REFERENCE TO RELATED APPLICATION

This application claims the priority and benefit under 35 USC §119 of Korean Patent Application No. 10-2014-0168382 filed on Nov. 28, 2014, with the Korean Intellectual Property Office, the disclosure of which is incorporated herein by reference.

BACKGROUND

1. Field

The present disclosure relates to a lens module having an optical system including four lenses.

2. Description of Related Art

A lens module mounted in a camera module provided in a mobile communications terminal includes a plurality of lenses. As an example, the lens module includes four lenses as a high-resolution optical system.

However, when the high-resolution optical system is configured using the plurality of lenses as described above, a length of the optical system, which is the distance from an object-side surface of a first lens to an image plane, increases. In this case, mounting of the lens module in a thinned mobile communications terminal may be somewhat difficult. Therefore, the development of a lens module in which the length of the optical system is decreased has been demanded.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a lens module, including: a first lens including a convex object-side surface and a convex image-side surface; a second lens including a concave object-side surface; a third lens including a meniscus shape; and a fourth lens including an inflection point formed on an image-side surface and a convex object-side surface, wherein a distance from an image-side surface of the third lens to the object-side surface of the fourth lens is less than 0.05.

The first lens may include a positive refractive power, the second lens may include a negative refractive power, the third lens may include a positive refractive power, and the fourth lens includes a negative refractive power.

The third lens may have a refractive power stronger than a refractive power of the first lens, and the second lens has a refractive power stronger than a refractive power of the fourth lens.

The first through fourth lenses may be sequentially disposed from an object side to an image side.

The image-side surface of the fourth lens may be concave in a paraxial region and gradually curves to be convex at an edge portion thereof.

An image-side surface of the second lens may be concave.

The image-side surface of the fourth lens may be concave.

BFL, a distance from the image-side surface of the fourth lens to an image plane, and, f, an overall focal length of an optical system including the first to fourth lenses, may satisfy $BFL/f<0.41$.

D6, a distance from the image-side surface of the third lens to the object-side surface of the fourth lens, and, f, an overall focal length of an optical system including the first to fourth lenses may satisfy $D6/f<0.19$.

r2, a radius of curvature of an image-side surface of the first lens may satisfy $-2.10<r2<-1.70$.

r2, a radius of curvature of an image-side surface of the first lens, and, f, an overall focal length of an optical system including the first to fourth lenses may satisfy $-0.94<r2/f<-0.79$.

r1, a radius of curvature of an object-side surface of the first lens, and, r2, a radius of curvature of an image-side surface of the first lens may satisfy $-0.50<(r1+r2)/(r1-r2)<0.10$.

In accordance with another embodiment, there is provided a lens module, including: a first lens including a convex object-side surface and a convex image-side surface; a second lens includes a concave object-side surface; a third lens includes a concave object-side surface; and a fourth lens including inflection point formed on an image-side surface and a convex object-side surface, wherein, r2, a radius of curvature of an image-side surface of the first lens, and, f, an overall focal length of an optical system including the first through fourth lenses satisfy $-0.94<r2/f<-0.79$.

The first lens may include a positive refractive power, the second lens may include a negative refractive power, the third lens may include a positive refractive power, and the fourth lens includes a negative refractive power.

The first through fourth lenses may be sequentially disposed from an object side to an image side.

An image-side surface of the third lens may be convex.

In accordance with another embodiment, there is provided a lens module including: a first lens including a convex object-side surface and a convex image-side surface; a second lens including a concave object-side surface; a third lens including a concave object-side surface; and a fourth lens including an inflection point formed on an image-side surface and a convex object-side surface, wherein, FOV, a field of view of an optical system including the first through fourth lenses is greater than 80.

The first lens may include a positive refractive power, the second lens may include a negative refractive power, the third lens may include a positive refractive power, and the fourth lens includes a negative refractive power.

The first through fourth lenses may be sequentially disposed from an object side to an image side.

An image-side surface of the second lens may be concave.

An image-side surface of the third lens may be convex.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 4 is a table representing characteristics of lenses illustrated in FIG. 1;

FIG. 5 is a table representing aspherical surface coefficients of the lens module illustrated in FIG. 1;

FIG. 9 is a table representing characteristics of lenses illustrated in FIG. 6;

FIG. 10 is a table representing aspherical surface coefficients of the lens module illustrated in FIG. 6;

FIG. 14 is a table representing characteristics of lenses illustrated in FIG. 11; and FIG. 15 is a table illustrating aspherical surface coefficients of the lens module illustrated in FIG. 11.

Figure 1:
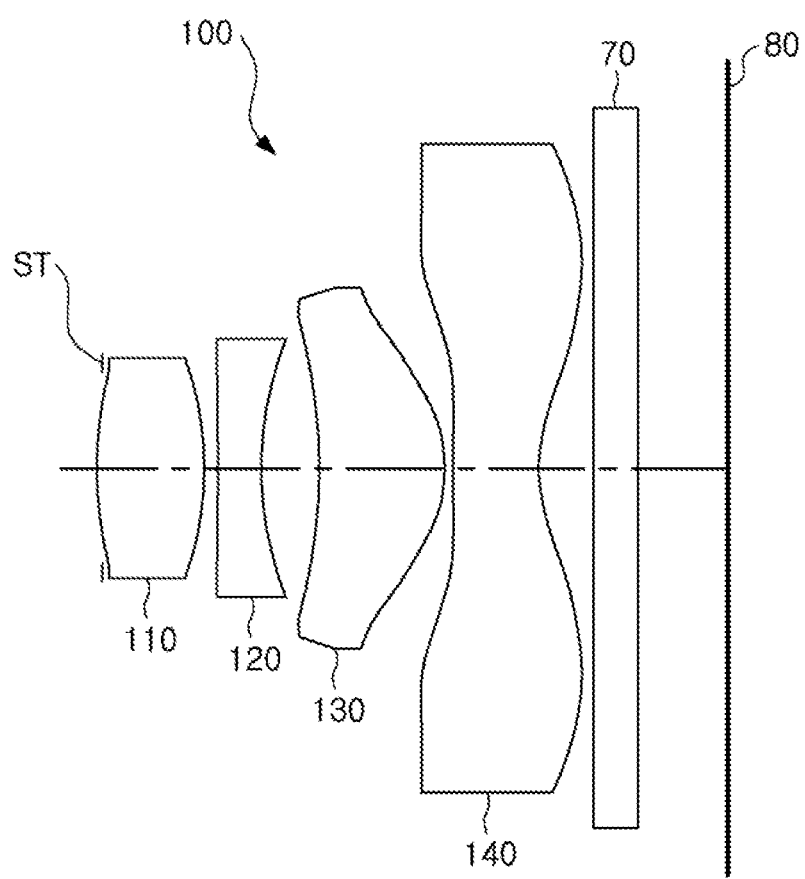
FIG. 1 is a view of a lens module, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

In the following lens configuration diagrams, thicknesses, sizes, and shapes of lenses may be exaggerated for clarity. Particularly, the shapes of spherical surfaces and aspherical surfaces, as illustrated in the lens configuration diagrams, are only illustrated by way of example, but are not limited to those illustrated in the drawings.

In some configurations, lenses included in lens modules are formed of plastic or polycarbonate, a material lighter than glass. In other configurations, some of the lenses included in the modules are formed of plastic or polycarbonate, and other lenses may be formed of glass. According to some configurations, a lens module may include four or more lenses in order to achieve high levels of resolution in images being captured.

In addition, in accordance with an embodiment, a first lens refers to a lens closest to an object (or a subject), while a fourth lens refers to a lens closest to an image plane (or an image sensor). Further, an object-side surface of each lens refers to a surface thereof closest to an object (or a subject), and an image-side surface of each lens refers to a surface thereof closest to an image plane (or an image sensor). Further, in the present specification, all of radii of curvature, thicknesses, optical axis distances (OALs) from an object-side surface of the first lens to the image plane), (a distance on the optical axis between the stop and the image sensor) SLs, image heights (IMGHs), and back focus lengths (BFLs) of the lenses, an overall focal length of an optical system, and a focal length of each lens are indicated by millimeters (mm). Further, thicknesses of lenses, gaps between the lenses, OALs, and SLs are distances measured in relation to an optical axis of the lenses.

Further, in a description for shapes of the lenses, a surface of a lens being convex is one in which an optical axis portion of a corresponding surface is convex, and a surface of a lens being concave is one in which an optical axis portion of a corresponding surface is concave. Therefore, although it is described that one surface of a lens is convex, an edge portion of the lens may be concave. Likewise, although it is described that one surface of a lens is concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

A lens module includes an optical system with a plurality of lenses. As an example, the optical system of the lens module may include four lenses having refractive power. However, the lens module is not limited thereto. For example, the lens module may include other components that do not have refractive power, such as a stop controlling an amount of light. As another example, the lens module includes an infrared cut-off filter filtering infrared light. As another example, the lens module may further include an image sensor, for example, an imaging device, to convert an image of a subject passing through the optical system into electrical signals. As another example, the lens module may further include a gap maintaining member adjusting a gap between lenses. In one illustrative embodiment, the gap maintaining member adjusts each lens to be at a distance from each other and the filter. However, in an alternative embodiment, the gap maintaining member may adjust each lens so that at least two of the lenses are in contact with each other, while the other lenses and the filter have a predetermined gap there between. In a further embodiment, the gap maintaining member may adjust each lens so that at least two of the lenses are in contact with each other, while the other lenses have a gap there between and at least one of the lenses is in contact with the filter.

First to fourth lenses are formed of materials having a refractive index different from that of air. For example, the first to fourth lenses are formed of plastic or glass. At least one of the first to fourth lenses may have an aspherical surface shape. As an example, the fourth lens of the first to fourth lenses has the aspherical surface shape. As another example, at least one surface of all of the first to fourth lenses is aspherical. In one example, the aspherical surface of each lens may be represented by the following Equation 1:

$$Z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20}.$$ [Equation 1]

In an example, c is an inverse of a radius of curvature of a corresponding lens, K is a conic constant, and r is a distance from a certain point on an aspherical surface to an optical axis in a direction perpendicular to the optical axis. In addition, constants A to J sequentially refer to 4-th order to 20-th order aspherical surface coefficients. In addition, Z is a distance between the certain point on the aspherical surface at the distance r and a tangential plane meeting the apex of the aspherical surface of the lens.

The lens module may include the first to fourth lenses. In addition, the lens module may further include a filter and an image sensor. In the following description, the above-mentioned components will be described. In accordance with an illustrative example, the embodiments described of the optical system include four lenses with a particular refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result.

Each of the first through sixth lenses has a refractive power, either negative or positive. For instance, in one configuration, the first lens has a positive refractive power.

Both surfaces of the first lens are convex. As an example, a first surface (object-side surface) of the first lens may be convex and a second surface (image-side surface) thereof may be convex.

The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to plastic. For example, the first lens may be formed of glass.

The second lens has a refractive power. For example, the second lens has a negative refractive power.

Both surfaces of the second lens may be concave. As an example, the second lens may have an object-side surface being concave and an image-side surface being concave. In an alternative embodiment, an object-side surface of the second lens is flat or substantially flat and the image-side surface is concave.

The second lens has at least one aspherical surface. In an example, both surfaces of the second lens are aspherical. The second lens is formed of a material having high light transmissivity and excellent workability. For example, the second lens is formed of plastic. However, a material of the second lens is not limited to plastic. For example, the second lens may be formed of glass.

The second lens is formed of a material having a high refractive index. For example, the second lens is formed of a material having a refractive index of 1.60 or more. In this example, the second lens has an Abbe number of 30 or less. The second lens formed of this material easily refracts light even while having a small degree of curvature. Therefore, in some of the many advantages associated with the present embodiment, the second lens formed of this material may be easily manufactured and be usefully used to lower a defect rate depending on manufacturing tolerance. In addition, the second lens may decrease a distance between lenses, such that it may be usefully used in miniaturizing the lens module.

The third lens has a refractive power. For example, the third lens has a positive refractive power.

The third lens may have a meniscus shape. As an example, the third lens may have a meniscus shape of which an object-side surface is concave and an image-side surface is convex.

The third lens has an aspherical surface. For example, both surfaces of the third lens are aspherical. The third lens is formed of a material having high light transmissivity and excellent workability. For example, the third lens may be formed of plastic or glass.

The fourth lens has a refractive power. For example, the fourth lens may have negative refractive power.

The fourth lens may have a meniscus shape. As an example, the fourth lens may have a meniscus shape of which an object-side surface is convex and an image-side surface is concave.

The fourth lens may have an aspherical surface. For example, both surfaces of the fourth lens are aspherical. The fourth lens is formed of a material having high light transmissivity and excellent workability. For example, the fourth lens is formed of plastic or glass.

The fourth lens includes an inflection point. As an example, at least one inflection point is formed on an object-side surface of the fourth lens. As another example, at least one inflection point is formed on an image-side surface of the fourth lens. The object-side surface of the fourth lens configured as described above has a convex part and a concave part formed alternately thereon. Similarly, the image-side surface of the fourth lens is concave at the center of the optical axis thereof and is convex at an edge portion thereof. For instance, the image-side surface of the fourth lens is concave in a paraxial region and gradually curves to be convex at an edge portion thereof.

A person of ordinary skill in the relevant art will appreciate that each of the first through fourth lenses may be configured in an opposite refractive power from the configuration described above. For example, in an alternative configuration, the first lens has a negative refractive power, the second lens has a positive refractive power, the third lens has a negative refractive power, and the fourth lens has a positive refractive power.

The filter filters a partial wavelength from incident light through the first to fourth lenses. As an example, the filter is an infrared cut-off filter filtering an infrared wavelength of the incident light.

The filter is formed of plastic or glass and has an Abbe number of 60 or less.

The image sensor is configured to realize high resolution of 1300 mega pixels. For example, a unit size of the pixels configuring the image sensor is 1.12 μm or less.

The lens module configured as described above has a relatively short length (TTL). For example, an overall length, which is a distance from the object-side surface of the first lens to the image plane of the lens module is 3.0 mm or less. Therefore, the lens module, according to an embodiment, is miniaturized thereof.

The lens module satisfies the following Conditional Expression 1:

$$BFL/f<0.41.$$ [Conditional Expression 1]

In one example, BFL is a distance from the image-side surface of the fourth lens to the image plane, and f is an overall focal length of the optical system including the first to fourth lenses.

The above Conditional Expression 1 is a relationship to configure the lens module. As an example, in a case in which the above Conditional Expression is satisfied, the lens module has a substantially short length (TTL).

In addition, the lens module satisfies at least one of the following Conditional Expressions 2 and 3:

$$D6<0.05$$ [Conditional Expression 2]

$$D6/f<0.19.$$ [Conditional Expression 3]

In this example, D6 is a distance from an image-side surface of the third lens to the object-side surface of the fourth lens, and f is the overall focal length of the optical system including the first to fourth lenses.

The above Conditional Expressions 2 and 3 are different relationships to be used to configure and miniaturize the lens module and realizing a telecentric optical system. As an example, in a case in which the above Conditional Expressions 2 and 3 are satisfied, the lens module has a substantially short length (TTL). As another example, in a case in which the above Conditional Expressions 2 and 3 are satisfied, a telecentric optical system may be easily realized.

In addition, the lens module may satisfy at least one of the following Conditional Expressions 4 and 5:

$$-2.10<r2<-1.70$$ [Conditional Expression 4]

$$-0.94<r2/f<-0.79.$$ [Conditional Expression 5]

In this example, r2 is a radius of curvature of the image-side surface of the first lens, and f is the overall focal length of the optical system including the first to fourth lenses.

The above Conditional Expressions 4 and 5 are relationships to optimize realization of the telecentric optical system and manufacturing of the first lens. As an example, in a case in which r2 and r2/f are outside of the lower limit values of the above Conditional Expressions 4 and 5, respectively, the first lens may be difficult to be manufactured and the telecentric optical system may not be realized. As another example, in a case in which r2 and r2/f are outside of the upper limit values of the above Conditional Expressions 4 and 5, respectively, the first lens is easier to be manufacture, but the telecentric optical system may be difficult to be realized.

In addition, the lens module satisfies the following Conditional Expression 6:

$$-0.50<(r1+r2)/(r1-r2)<0.10.$$ [Conditional Expression 6]

In one example, r1 is a radius of curvature of the object-side surface of the first lens, and r2 is a radius of curvature of the image-side surface of the first lens.

The above Conditional Expression 6 is a relationship to optimize the configuration and manufacture of the first lens. As an example, in a case in which (r1+r2)/(r1−r2) satisfies a numerical range of the above Conditional Expression 6, the first lens is easily manufactured and it is insensitive to manufacturing tolerance.

A lens module, according to a first embodiment, will be described with reference to FIG. 1.

A lens module 100 includes an optical system including a first lens 110, a second lens 120, a third lens 130, and a fourth lens 140. In addition, the lens module 100 also includes an infrared cut-off filter 70 and an image sensor 80. Further, the lens module 100 includes a stop (ST). For example, the stop is disposed in front of an object-side surface of the first lens.

In the various embodiments, the first lens 110 has a positive refractive power, and an object-side surface thereof is convex and an image-side surface thereof is convex. The second lens 120 has a negative refractive power, and an object-side surface thereof is concave and an image-side surface thereof is concave. The third lens 130 has a positive refractive power, and an object-side surface thereof is concave and an image-side surface thereof is convex. The fourth lens 140 has a negative refractive power, and an object-side surface thereof is convex and an image-side surface thereof is concave. In addition, at least one inflection point is formed on each of the object-side surface and the image-side surface of the fourth lens.

Both of the first and third lenses 110 and 130 have positive refractive power. In one example, the third lens 130 has a refractive power stronger than that of the first lens 110. Both of the second and fourth lenses 120 and 140 have a negative refractive power. In one example, the second lens 120 has a refractive power stronger than that of the fourth lens 140.

Figure 2:
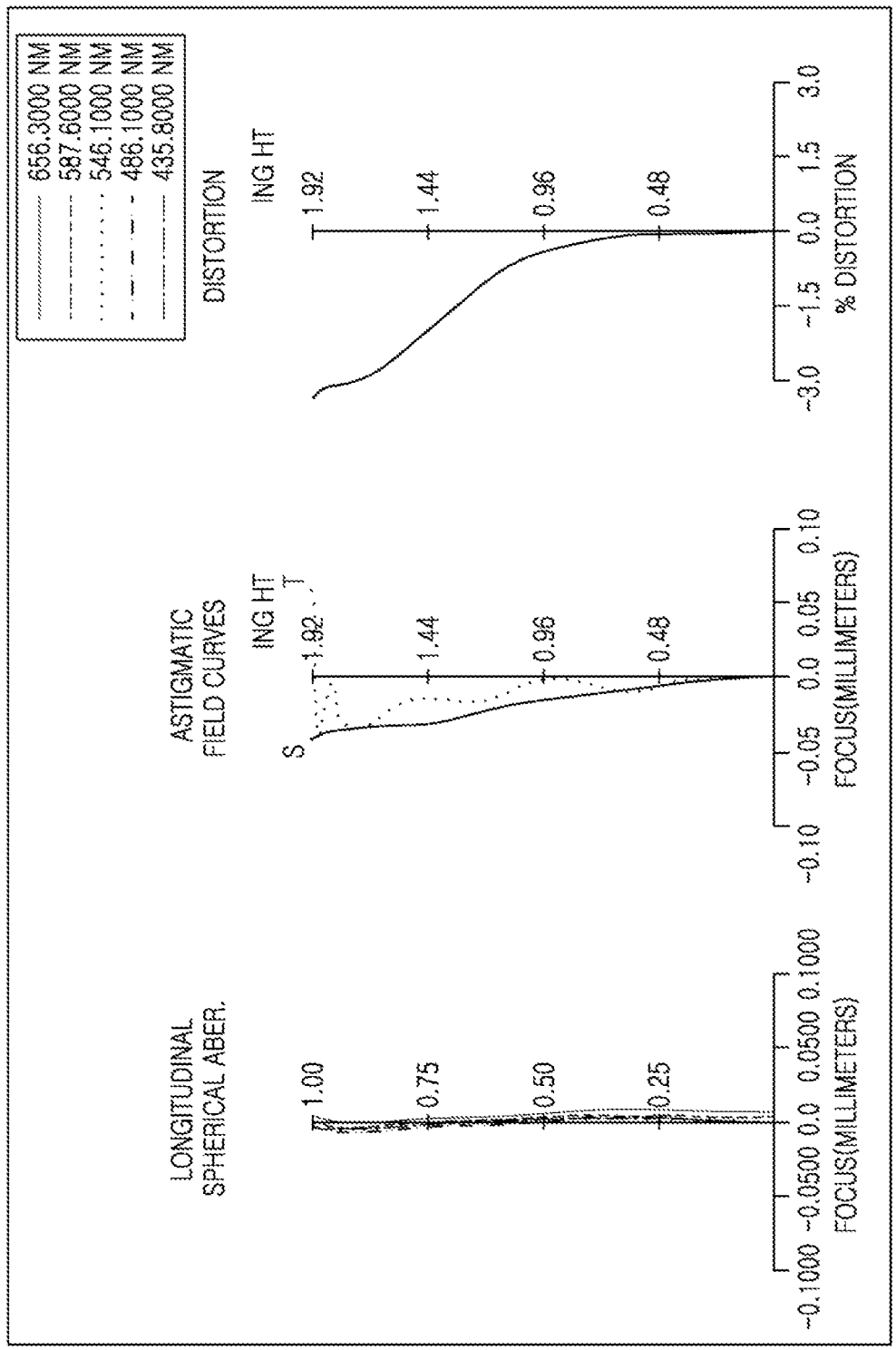
FIG. 2 is a graph containing curves which represent aberration characteristics of the lens module illustrated in FIG. 1.
Figure 3:
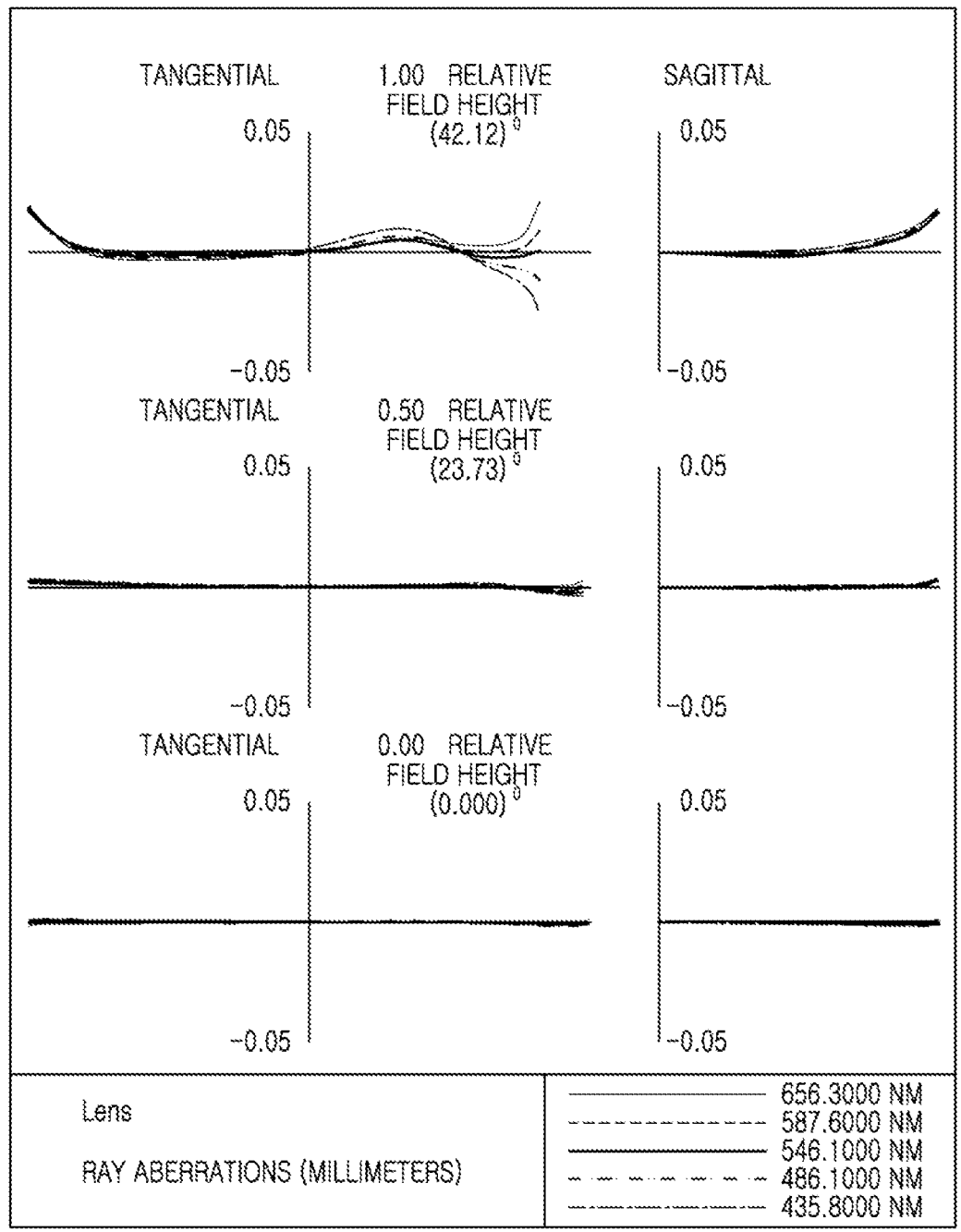
FIG. 3 is a graphs containing curves that represent coma aberration characteristics of the lens module illustrated in FIG. 1.

FIGS. 2 and 3 are graphs containing curves which represent aberration characteristics of the lens module, in accordance with an embodiment.

FIG. 4 is a table representing characteristics of the lenses configuring the lens module. In FIG. 4, Surface Nos. 1 and 2 represent the first surface (object-side surface) and the second surface (image-side surface) of the first lens, and Surface Nos. 3 and 4 represent the first and second surfaces of the second lens. Similarly, Surface Nos. 5 to 8 represent the first and second surfaces of the third and fourth lenses, respectively. In addition, Surface Nos. 11 and 12 represent first and second surfaces of the infrared cut-off filter.

FIG. 5 is a table representing aspherical surface coefficients of the lenses configuring the lens module, in accordance with an embodiment. In FIG. 5, in a first embodiment, surface sides of each of the first to fourth lenses are represented against characteristics corresponding to each surface of the lenses.

Figure 6:
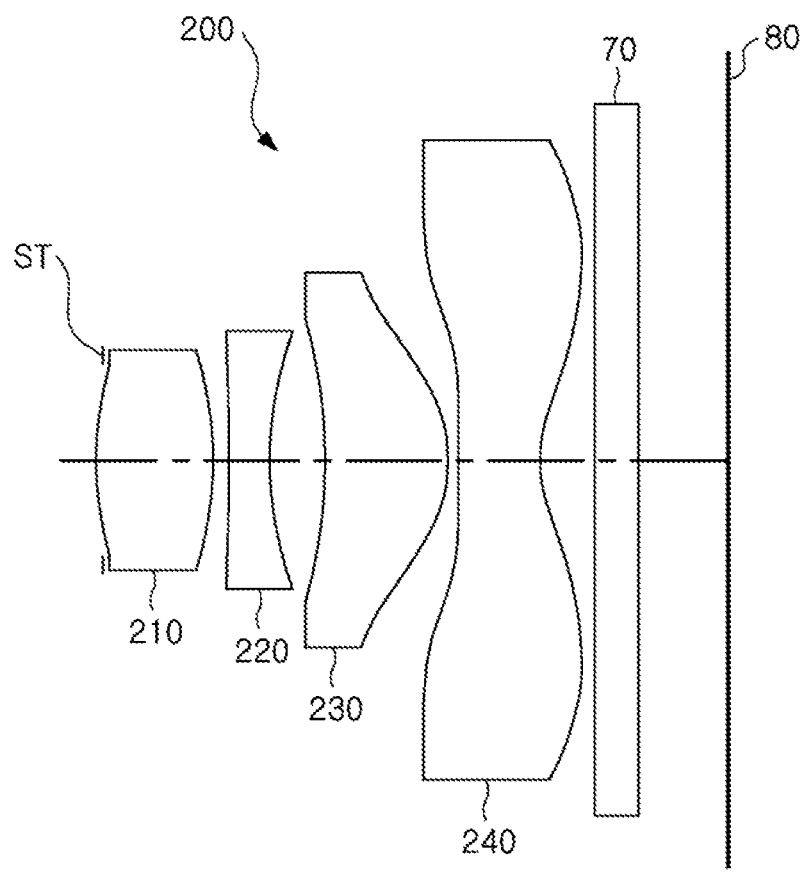
FIG. 6 is a view of a lens module, according to a second embodiment.

A lens module, according to a second embodiment, will be described with reference to FIG. 6.

A lens module 200 include an optical system including a first lens 210, a second lens 220, a third lens 230, and a fourth lens 240. In addition, the lens module 200 further includes an infrared cut-off filter 70 and an image sensor 80. Further, the lens module 200 includes a stop (ST). For example, the stop is disposed in front of an object-side surface of the first lens.

In the embodiment, the first lens 210 has a positive refractive power, and an object-side surface thereof is convex and an image-side surface thereof may be convex. The second lens 220 has a negative refractive power, and an object-side surface thereof is concave and an image-side surface thereof is concave. The third lens 230 has a positive refractive power, and an object-side surface thereof is concave and an image-side surface thereof is convex. The fourth lens 240 has a negative refractive power, and an object-side surface thereof is convex and an image-side surface thereof is concave. In addition, at least one inflection point is formed on each of the object-side surface and the image-side surface of the fourth lens.

The first and third lenses 210 and 230 have positive refractive power. In one example, the third lens 230 has a refractive power stronger than the refractive power of the first lens 210. The second and fourth lenses 220 and 240 have negative refractive power. In one example, the second lens 220 has a refractive power stronger than that of the fourth lens 240.

Figure 7:
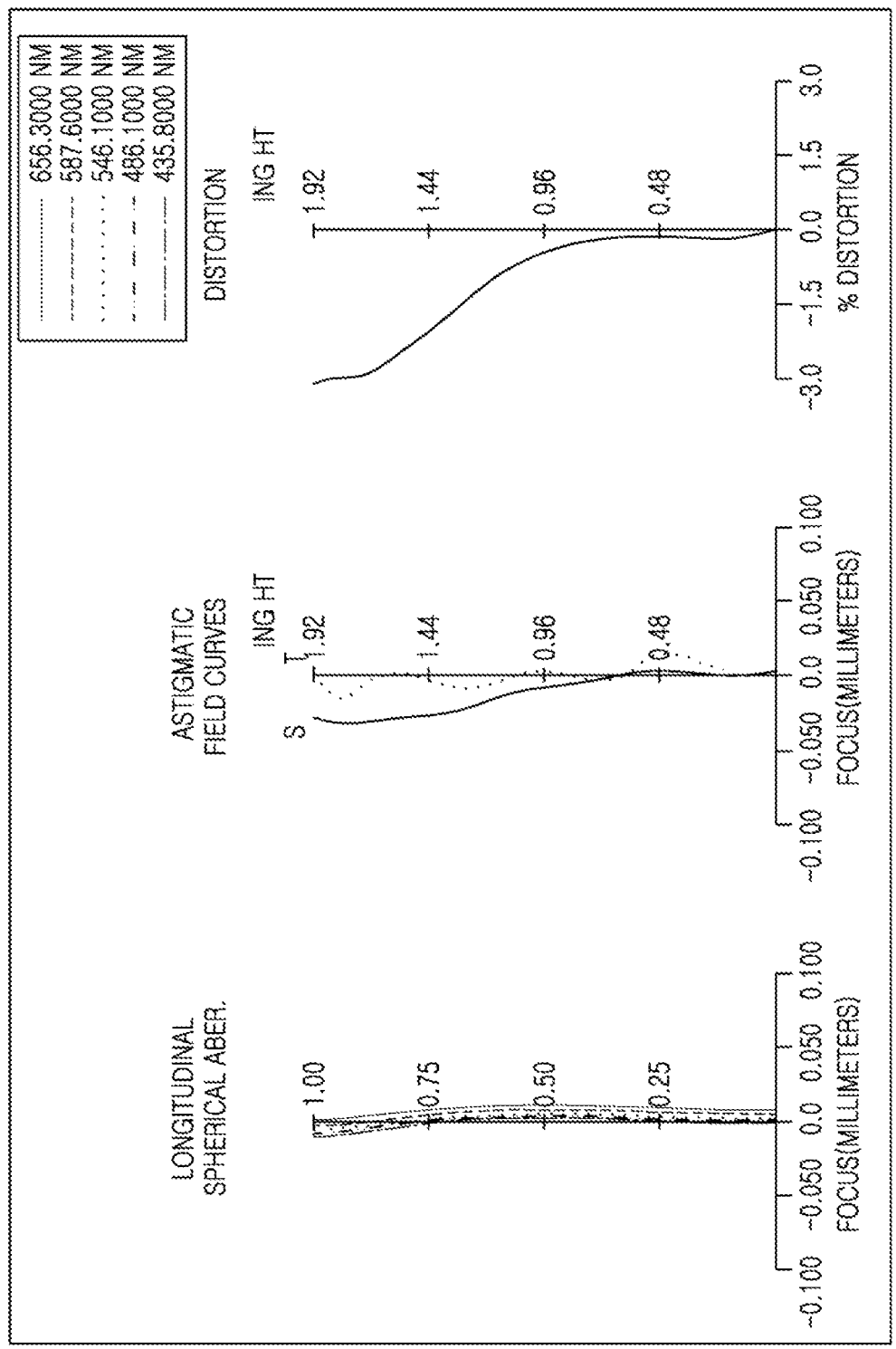
FIG. 7 is a graph containing curves which represent aberration characteristics of the lens module illustrated in FIG. 6.
Figure 8:
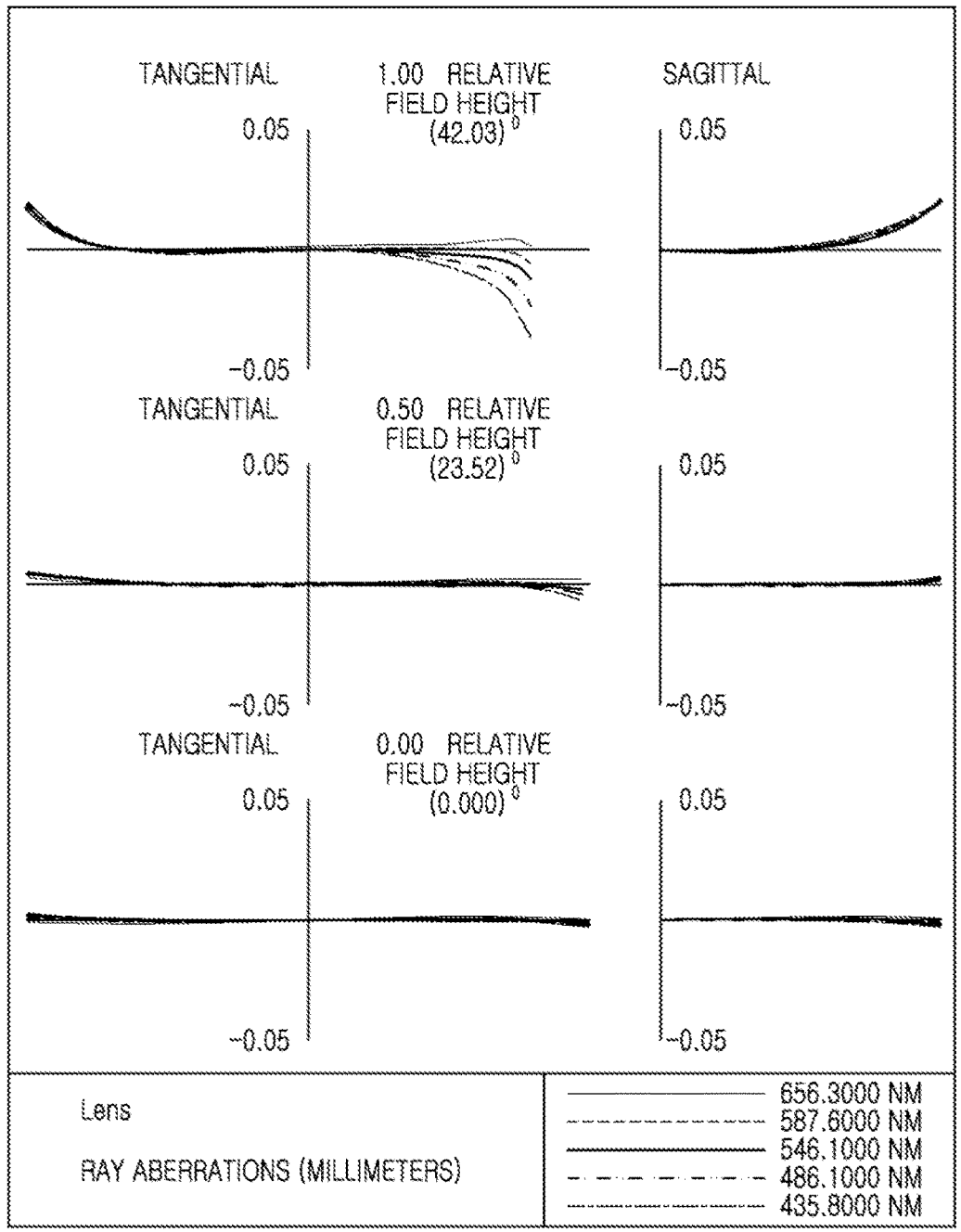
FIG. 8 is a graph containing curves that represent coma aberration characteristics of the lens module illustrated in FIG. 6.

FIGS. 7 and 8 are graphs containing curves which represent aberration characteristics of the lens module, in accordance with an embodiment.

FIG. 9 is a table representing characteristics of the lenses configuring the lens module. In FIG. 9, Surface Nos. 1 and 2 represent the first surface (object-side surface) and the second surface (image-side surface) of the first lens, and Surface Nos. 3 and 4 represent the first and second surfaces of the second lens. Similarly, Surface Nos. 5 to 8 represent the first and second surfaces of the third and fourth lenses, respectively. In addition, Surface Nos. 11 and 12 represent first and second surfaces of the infrared cut-off filter.

FIG. 10 is a table representing aspherical surface coefficients of the lenses configuring the lens module, in accordance with an embodiment. In FIG. 10, in a second embodiment, surface sides of each of the first to fourth lenses are represented against characteristics corresponding to each surface of the lenses.

Figure 11:
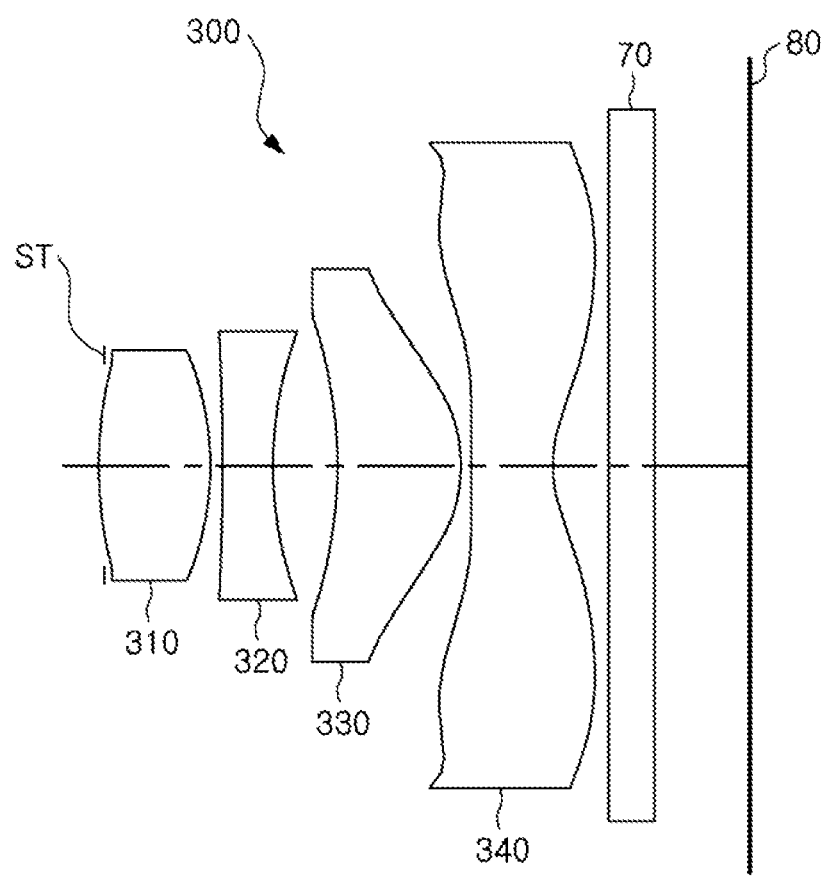
FIG. 11 is a view of a lens module, according to a third embodiment.

A lens module, according to a third embodiment, will be described with reference to FIG. 11.

A lens module 300 includes an optical system including a first lens 310, a second lens 320, a third lens 330, and a fourth lens 340. In addition, the lens module 100 further includes an infrared cut-off filter 70 and an image sensor 80. Further, the lens module 300 includes a stop (ST). For example, the stop is disposed in front of an object-side surface of the first lens.

In the embodiment, the first lens 310 is a positive refractive power, and an object-side surface thereof is convex and an image-side surface thereof is convex. The second lens 320 has a negative refractive power, and an object-side surface thereof is concave and an image-side surface thereof is concave. The third lens 330 has a positive refractive power, and an object-side surface thereof is concave and an image-side surface thereof is convex. The fourth lens 340 has a negative refractive power, and an object-side surface thereof is convex and an image-side surface thereof is concave. In addition, at least one inflection point is formed on each of the object-side surface and the image-side surface of the fourth lens.

The first and third lenses 310 and 330 have positive refractive power. In one example, the third lens 330 has a refractive power stronger than the refractive power of the first lens 310. The second and fourth lenses 320 and 340 have a negative refractive power. In one example, the second lens 320 has a refractive power stronger than that of the fourth lens 340.

Figure 12:
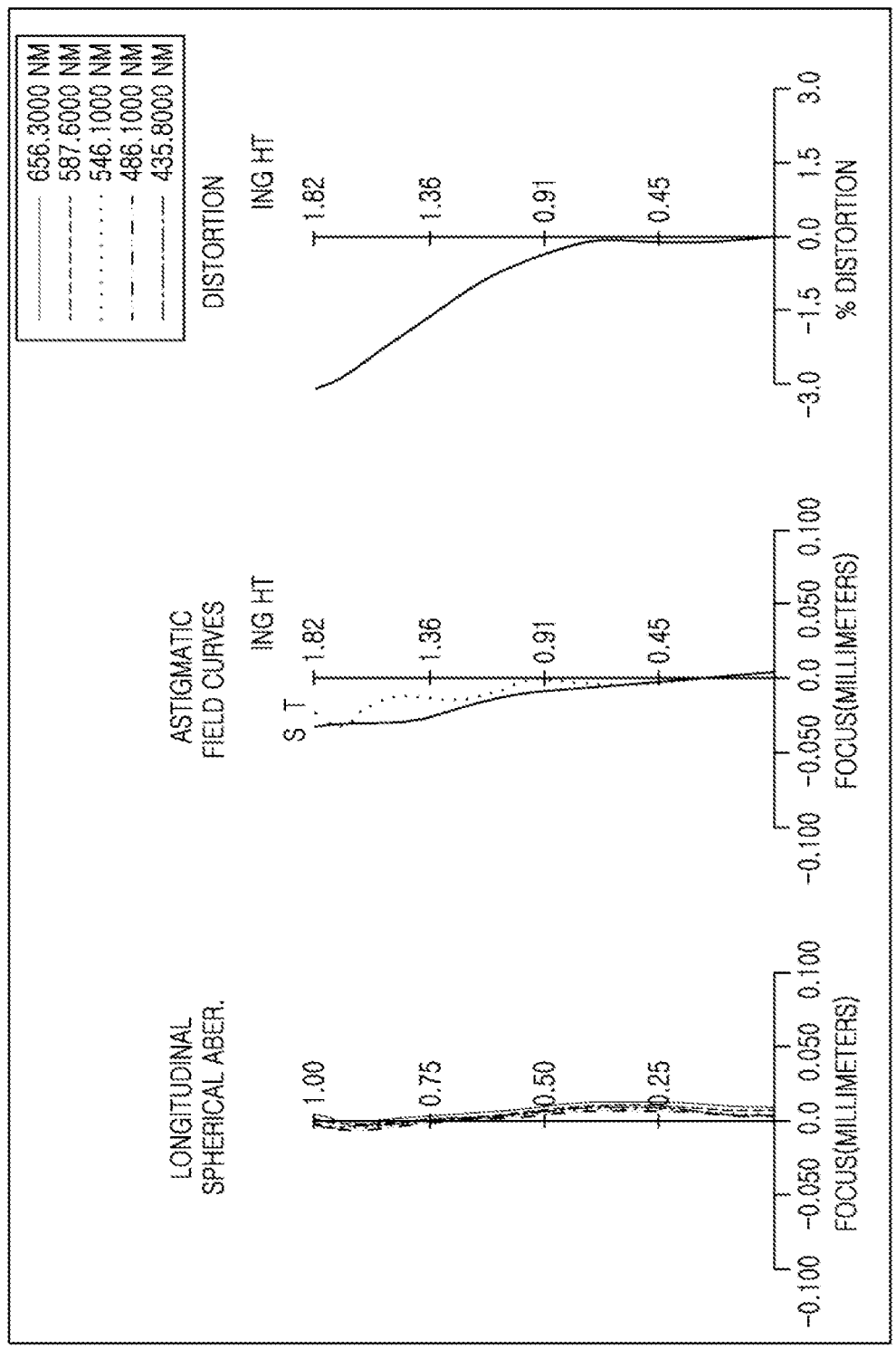
FIG. 12 is a graph containing curves that represent aberration characteristics of the lens module illustrated in FIG. 11.
Figure 13:
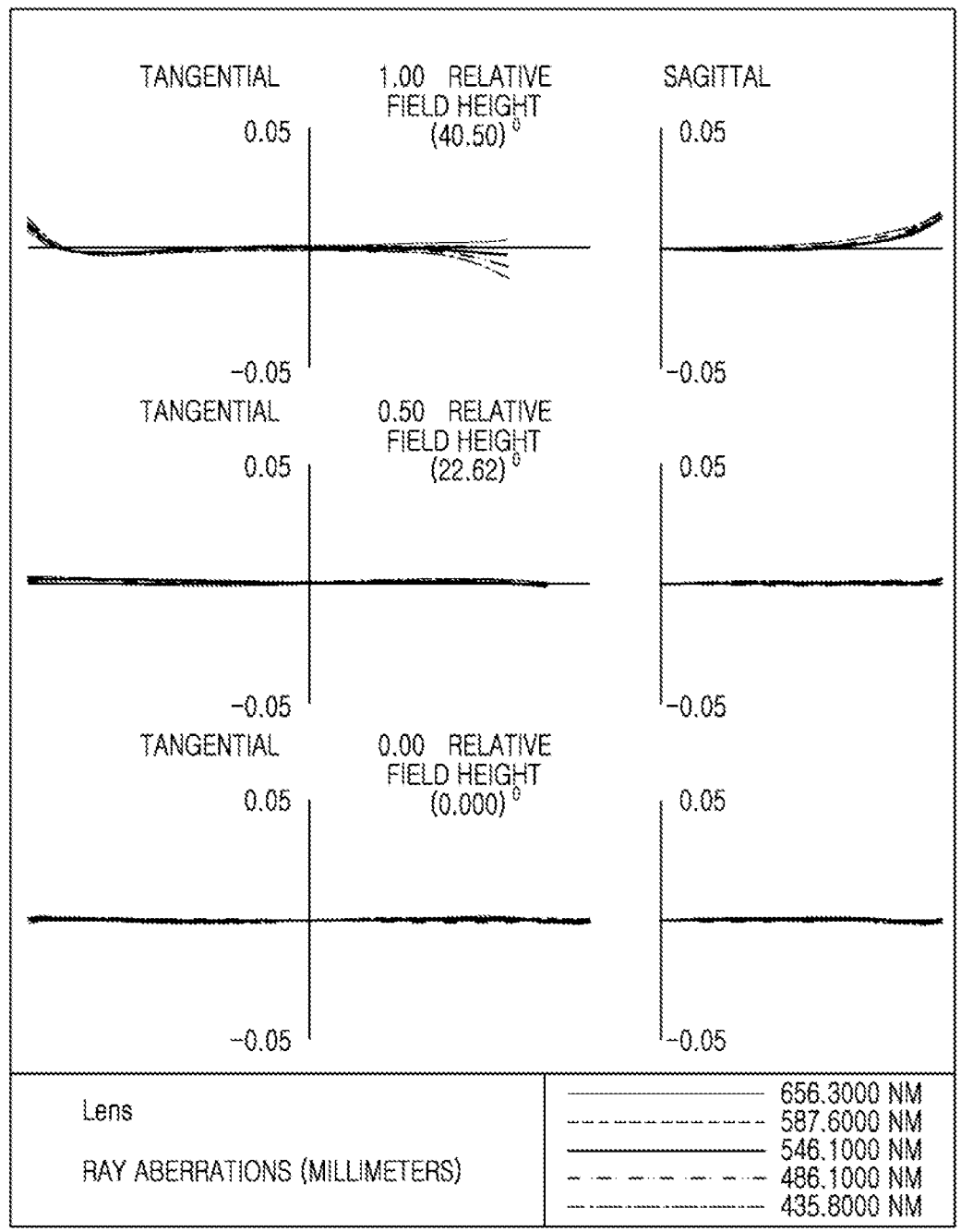
FIG. 13 is a graph containing curves which represent coma aberration characteristics of the lens module illustrated in FIG. 11.

FIGS. 12 and 13 are graphs containing curves which represent aberration characteristics of the lens module, in accordance with an embodiment.

FIG. 14 is a table representing characteristics of the lenses configuring the lens module. In FIG. 14, Surface Nos. 1 and 2 represent the first surface (object-side surface) and the second surface (image-side surface) of the first lens, and Surface Nos. 3 and 4 represent the first and second surfaces of the second lens. Similarly, Surface Nos. 5 to 8 indicate the first and second surfaces of the third and fourth lenses, respectively. In addition, Surface Nos. 11 and 12 represent first and second surfaces of the infrared cut-off filter.

FIG. 15 is a table representing aspherical surface coefficients of the lenses configuring the lens module, in accordance with an embodiment. In FIG. 15, in a third embodiment, surface sides of each of the first to fourth lenses are represented against characteristics corresponding to each surface of the lenses.

Table 1 represents optical characteristics of the lens modules, according to the first to third embodiments. The lens module has an overall focal length (f) of 2.10 to 2.30. A focal length (f1) of the first lens is defined to be within a range of 1.50 to 1.70. A focal length (f2) of the second lens is defined to be within a range of −2.90 to −2.50. A focal length (f3) of the third lens is defined to be within a range of 1.00 to 1.50. A focal length (f4) of the fourth lens is defined to be within a range of −1.50 to −0.90. An overall length of the optical system is defined to be within a range of 2.80 to 3.00, and a field of view (FOV) may be 80 degrees.

TABLE 1

| Remarks | First Embodiment | Second Embodiment | Third Embodiment |
| --- | --- | --- | --- |
| f (EFL) | 2.1814 | 2.1819 | 2.1832 |
| f1 | 1.6133 | 1.6555 | 1.5635 |
| f2 | −2.6801 | −2.7937 | −2.6164 |
| f3 | 1.2617 | 1.1689 | 1.3640 |
| f4 | −1.1978 | −1.0971 | −1.2867 |
| TTL | 2.9605 | 2.9698 | 2.9237 |
| BFL | 0.8890 | 0.8912 | 0.8851 |
| FOV | 84.300 | 84.000 | 81.000 |
| ImgH | 1.9200 | 1.9200 | 1.8200 |

Table 2 represents numerical ranges of Conditional Expressions 1 through 6 and values of Conditional Expressions 1 through 6 of the lens modules according to the first to third exemplary embodiments.

TABLE 2

| Conditional Expressions | First Embodiment | Second Embodiment | Third Embodiment |
| --- | --- | --- | --- |
| BFL/f | 0.4075 | 0.4084 | 0.4054 |
| D6 | 0.0403 | 0.0400 | 0.0400 |
| D6/f | 0.0185 | 0.0183 | 0.0183 |
| r2 | −1.8572 | −2.0354 | −1.7300 |
| r2/f | −0.8514 | −0.9328 | −0.7924 |
| (r1 + r2)/(r1 − r2) | −0.1010 | −0.1601 | −0.0664 |

As seen in Table 2, the lens modules, according to the first to third embodiments, satisfy all of the Conditional Expressions 1 through 6.

As set forth above, according to the embodiments, an optical system with high resolution is obtained.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module, comprising:
a first lens comprising a convex object-side surface and a convex image-side surface;
a second lens comprising a concave object-side surface;
a third lens comprising a meniscus shape; and
a fourth lens comprising an inflection point formed on an image-side surface and a convex object-side surface,
wherein a distance from an image-side surface of the third lens to the object-side surface of the fourth lens is less than 0.05 millimeters (mm), and
wherein BFL, a distance from the image-side surface of the fourth lens to an image plane, and f, an overall focal length of an optical system including the first to fourth lenses, satisfy BFL/f<0.41, and BFL and f have a same unit of measure.

2. The lens module of claim 1, wherein the first lens comprises a positive refractive power, the second lens comprises a negative refractive power, the third lens comprises a positive refractive power, and the fourth lens comprises a negative refractive power.

3. The lens module of claim 1, wherein the third lens has a refractive power stronger than a refractive power of the first lens, and the second lens has a refractive power stronger than a refractive power of the fourth lens.

4. The lens module of claim 1, wherein the first through fourth lenses are sequentially disposed from an object side to an image side.

5. The lens module of claim 1, wherein the image-side surface of the fourth lens is concave in a paraxial region and gradually curves to be convex at an edge portion thereof.

6. The lens module of claim 1, wherein an image-side surface of the second lens is concave.

7. The lens module of claim 1, wherein the image-side surface of the fourth lens is concave.

8. The lens module of claim 1, wherein, D6, a distance from the image-side surface of the third lens to the object-side surface of the fourth lens, and, f, an overall focal length of an optical system including the first to fourth lenses satisfy D6/f<0.19, and D6 and f have a same unit of measure.

9. The lens module of claim 1, wherein,
r2, a radius of curvature of an image-side surface of the first lens satisfies −2.10 mm<r2<−1.70 mm.

10. The lens module of claim 1, wherein, r2, a radius of curvature of an image-side surface of the first lens, and, f, an overall focal length of an optical system including the first to fourth lenses satisfy −0.94<r2/f<−0.79, and r2 and f have a same unit of measure.

11. The lens module of claim 1, wherein,
r1, a radius of curvature of an object-side surface of the first lens, and, r2, a radius of curvature of an image-side surface of the first lens satisfy −0.50<(r1+r2)/(r1−r2)<0.10, and r1 and r2 have a same unit of measure.

12. A lens module, comprising:
a first lens comprising a convex object-side surface and a convex image-side surface;
a second lens comprises a concave object-side surface;
a third lens comprises a concave object-side surface; and
a fourth lens comprising inflection point formed on an image-side surface and a convex object-side surface,
wherein, r2, a radius of curvature of an image-side surface of the first lens, and f, an overall focal length of an optical system including the first through fourth lenses satisfy −0.94<r2/f<−0.79, and
wherein BFL, a distance from the image-side surface of the fourth lens to an image plane, and f satisfy BFL/f<0.41, and BFL, r2 and f have a same unit of measure.

13. The lens module of claim 12, wherein the first lens comprises a positive refractive power, the second lens comprises a negative refractive power, the third lens comprises a positive refractive power, and the fourth lens comprises a negative refractive power.

14. The lens module of claim 12, wherein the first through fourth lenses are sequentially disposed from an object side to an image side.

15. The lens module of claim 12, wherein an image-side surface of the third lens is convex.

16. A lens module comprising:
a first lens comprising a convex object-side surface and a convex image-side surface;
a second lens comprising a concave object-side surface;
a third lens comprising a concave object-side surface; and
a fourth lens comprising an inflection point formed on an image-side surface and a convex object-side surface,
wherein, FOV, a field of view of an optical system including the first through fourth lenses is greater than 80 degrees, and
wherein BFL, a distance from the image-side surface of the fourth lens to an image plane, and f, an overall focal length of an optical system including the first to fourth lenses, satisfy BFL/f<0.41, and BFL and f have a same unit of measure.

17. The lens module of claim 16, wherein the first lens comprises a positive refractive power, the second lens comprises a negative refractive power, the third lens comprises a positive refractive power, and the fourth lens comprises a negative refractive power.

18. The lens module of claim 16, wherein the first through fourth lenses are sequentially disposed from an object side to an image side.

19. The lens module of claim 16, wherein an image-side surface of the second lens is concave.

20. The lens module of claim 16, wherein an image-side surface of the third lens is convex.

* * * * *